US012591105B2

(12) United States Patent
Falasca et al.

(10) Patent No.: US 12,591,105 B2
(45) Date of Patent: Mar. 31, 2026

(54) ELECTRONIC FOCUS ADJUSTMENT FOR C-MOUNT LENS USING PCB PIEZOELECTRIC MOTOR

(71) Applicant: Datalogic IP Tech S.r.l., Calderara di Reno (IT)

(72) Inventors: Matteo Falasca, Bologna (IT); Alessandro Brunetta, Padua (IT)

(73) Assignee: Datalogic IP Tech S.r.l., Calderara di Reno (IT)

( * ) Notice: Subject to any disclaimer, the term of this patent is extended or adjusted under 35 U.S.C. 154(b) by 77 days.

(21) Appl. No.: 18/156,861

(22) Filed: Jan. 19, 2023

(65) Prior Publication Data

US 2024/0248279 A1      Jul. 25, 2024

(51) Int. Cl.
    *G02B 7/08*     (2021.01)
    *G06K 7/10*     (2006.01)
    *H02N 2/16*     (2006.01)

(52) U.S. Cl.
    CPC ........... *G02B 7/08* (2013.01); *G06K 7/10861* (2013.01); *H02N 2/163* (2013.01)

(58) Field of Classification Search
    CPC ....... G02B 7/08; G06K 7/10861; H02N 2/163
    USPC ...................................... 235/462.14
    See application file for complete search history.

(56) References Cited

U.S. PATENT DOCUMENTS 7,723,900 B2    5/2010   Ellesgaard et al.
8,803,060 B2    8/2014   Nunnink et al.
2007/0280667 A1* 12/2007 Shin .......................... G03B 3/10
                                     396/133
2008/0137214 A1*  6/2008 Su ........................... H04N 23/57
                                       359/676
2012/0195579 A1*  8/2012 Ho .......................... G03B 17/12
                                       396/74
2012/0218455 A1*  8/2012 Imai ..................... G02B 13/001
                                       348/340
2014/0092493 A1*  4/2014 Topliss ................. G02B 27/648
                                       359/824
2015/0323759 A1* 11/2015 Torii ........................ G03B 3/02
                                       359/825
2021/0003811 A1    1/2021   Nunnink et al.
2021/0096445 A1*  4/2021 Zhu .......................... H02K 7/14
2022/0046151 A1*  2/2022 Shabtay ......... G02B 15/143103

* cited by examiner

*Primary Examiner* — Michael G Lee
*Assistant Examiner* — David Tardif
(74) *Attorney, Agent, or Firm* — Foley & Lardner LLP

(57) ABSTRACT

An optical imaging system, such as a scanner system for imaging machine-readable indicia may include a lens device, an adapter ring, and a PCB piezoelectric motor. The lens device may include an adjustable optical component operably coupled to a rotatable feature. The adapter ring may be engaged to the rotatable feature of the lens device so as to control movement of the rotatable feature. The PCB piezoelectric motor may include a stator mounted thereto, and a rotor configured to rotate relative to the stator. The rotor may be coupled to the adapter ring so that applying rotational energy to the stator causes the adapter ring to rotate, thereby causing the adjustable optical component to be adjusted.

22 Claims, 8 Drawing Sheets

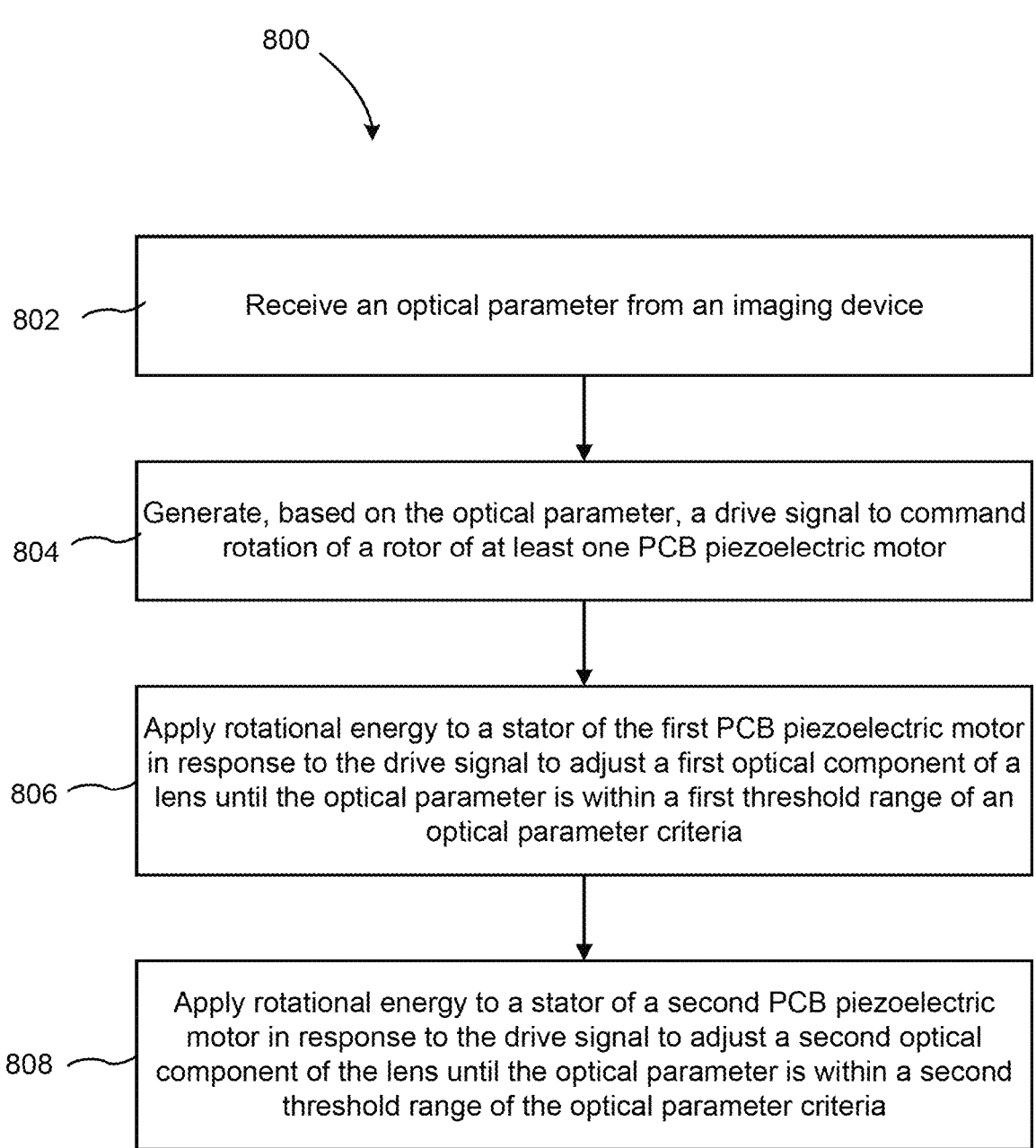

800

802 — Receive an optical parameter from an imaging device

804 — Generate, based on the optical parameter, a drive signal to command rotation of a rotor of at least one PCB piezoelectric motor 806 — Apply rotational energy to a stator of the first PCB piezoelectric motor in response to the drive signal to adjust a first optical component of a lens until the optical parameter is within a first threshold range of an optical parameter criteria 808 — Apply rotational energy to a stator of a second PCB piezoelectric motor in response to the drive signal to adjust a second optical component of the lens until the optical parameter is within a second threshold range of the optical parameter criteria

FIG. 8

ELECTRONIC FOCUS ADJUSTMENT FOR C-MOUNT LENS USING PCB PIEZOELECTRIC MOTOR

BACKGROUND

Imaging systems, such as barcode scanners and/or barcode readers, enable imaging of scenes and features within a scene, for example, machine image capture of objects on which printed barcodes are positioned for performing product tracking and/or other logistics operations. Generally speaking, a barcode scanner may include an optical sensor that images the printed barcode a distance away from the product, and processor that decodes the data represented by the barcode image to identify the contents of the package.

One challenge for users of barcode scanners relates to scanning and/or imaging of product labels at variable distances away from the barcode scanner. For example, it may be desirable to scan barcode labels on packages moving along a conveyer system. The products may be of various sizes and may be located at different positions along the conveyer and at different orientations relative to the optical sensor. If not properly calibrated and/or focused, the barcode scanner may have difficulty obtaining images of sufficient clarity for data processing operations. As such, there is a need for barcode scanner and barcode scanning methods for product label analysis that improve image quality and resolution over various distances and from different points-of-view.

Moreover, setting up imaging systems, such as cameras and barcode scanners as part of logistics or other equipment is generally time consuming because imaging systems often have to be focused or otherwise calibrated to function within different environments or configurations. In the case of setting up equipment in which an imaging system has to be properly oriented and focused, such a setup may be time consuming and require a technician or other specialist to perform the setup because of how conventional cameras and barcode scanners have to be manually manipulated during the setup process. As such, there is a further need for barcode scanners and other imaging systems to provide a faster and easier configuration and setup process.

BRIEF SUMMARY

To provide for easier installation of and an improved focus adjustment for barcode scanners and other optical imaging systems in various applications, including industrial and fixed-mount scanners for object logistics, production, and distribution environments that have high field-of-view, multi-label reading capabilities, or any other form of industrial/commercial barcode scanner, an electromechanical focus adjustment system may include an actuator and controller. The electromechanical focus adjustment system may be configured to adjust an optical component of a lens device of the barcode scanner, for example, to reduce or eliminate manual adjustment by a user during both pre- and post-installation phases of equipment. The lens device may include one or more lenses and adjustable optical component(s). In an embodiment, the actuator may include a printed circuit board (PCB) piezoelectric motor that (i) may be integrally formed with an electronic control board of the barcode scanner, and (ii) may also be used to facilitate imaging and/or image processing operations for the barcode scanner. By integrating the actuator with existing electronic components within the barcode scanner, the electronic focus adjustment system can be implemented with a minimum number of independent components, thereby minimizing package size and weight of the barcode scanner system. It should be understood that the scanner or similar actuator may be integrated into other types of optical systems, which may enable utilization of automatic and/or remote controls to perform focusing or to perform another optical and/or mechanical adjustment. It should further be understood that the actuator may be integrated with an imaging system at the time of manufacturer (i.e., an original equipment manufacturer (OEM)) or be adapted to engage the imaging system as after-market equipment.

The PCB piezoelectric motor may, for example, include a stator that is integrally formed into a control board (e.g., a PCB with an onboard or an offboard controller) of the barcode scanner so that the control board circuitry (i) controls operation of both image capture and/or data processing operations, and (ii) powers optical focus adjustment for the imaging device. A rotor of the PCB piezoelectric motor may be coupled to an adapter ring that is physically engaged with a rotatable feature of the lens device. The rotatable feature of the lens device may be, for example, an adjustable optical component of the lens device, such as a focus ring or iris. Applying rotational energy to the stator causes the focus ring or iris to rotate, thereby adjusting the focus of the lens device. In some embodiments, the electronic focus adjustment system may be configured to automatically adjust the optical focus of the lens device responsive to measuring an optical parameter (e.g., optical characteristics of an image capture by an optical sensor, etc.) independent of user input or measuring distance by means of distance sensors (e.g., time-of-flight (TOF) sensor or sensor type configured to provide for distance measurements).

One embodiment of the present disclosure relates to an optical imaging system. The system includes a lens device, an adapter ring, and a PCB piezoelectric motor. The lens device may include an adjustable optical component operably coupled to a rotatable feature. The adapter ring may be engaged to the rotatable feature of the lens device so as to control movement of the rotatable feature. The PCB piezoelectric motor may include a stator mounted thereto, and a rotor configured to rotate relative to the stator. The rotor may be coupled to the adapter ring so that applying rotational energy to the stator causes the adapter ring to rotate, thereby causing the adjustable optical component to be adjusted.

Another embodiment of the present disclosure relates to a scanner assembly. The scanner assembly includes a scanner support structure, a lens assembly including a lens device, an imaging device, and an electronic control system. The lens assembly may be fixedly coupled to the scanner support structure and may include a focus ring. The imaging device may be positioned to receive light through the lens device. The electronic control system may include a PCB that may be electrically coupled to the imaging device, a processor disposed on the PCB and configured to process images from the imaging device, and a piezoelectric motor having a stator formed on the PCB. The piezoelectric motor may further include a rotor ring that is rotationally coupled to the focus ring so as to rotate the focus ring when a rotational current is applied to the stator.

Yet another embodiment of the present disclosure relates to a method of operating an optical imaging system. The method may include (i) receiving, by a controller, an optical parameter from an imaging device; (ii) generating, by the controller, based on the optical parameter, a drive signal to command rotation of a rotor of a first printed circuit board piezoelectric motor; and (iii) applying rotational energy to a stator of the first PCB piezoelectric motor in response to the drive signal to cause the rotor to rotate a first adapter ring that is fixedly coupled to a first rotatable feature of a lens device so as to adjust a first optical component of the lens device until the optical parameter satisfies an optical parameter criteria.

BRIEF DESCRIPTION OF THE FIGURES

Illustrative embodiments of the present invention are described in detail below with reference to the attached drawing figures, which are incorporated by reference herein and wherein:

FIG. 8 is a flow diagram of an illustrative method of operating an optical imaging system to automatically adjust an optical component thereof.

DETAILED DESCRIPTION

Figure 1:
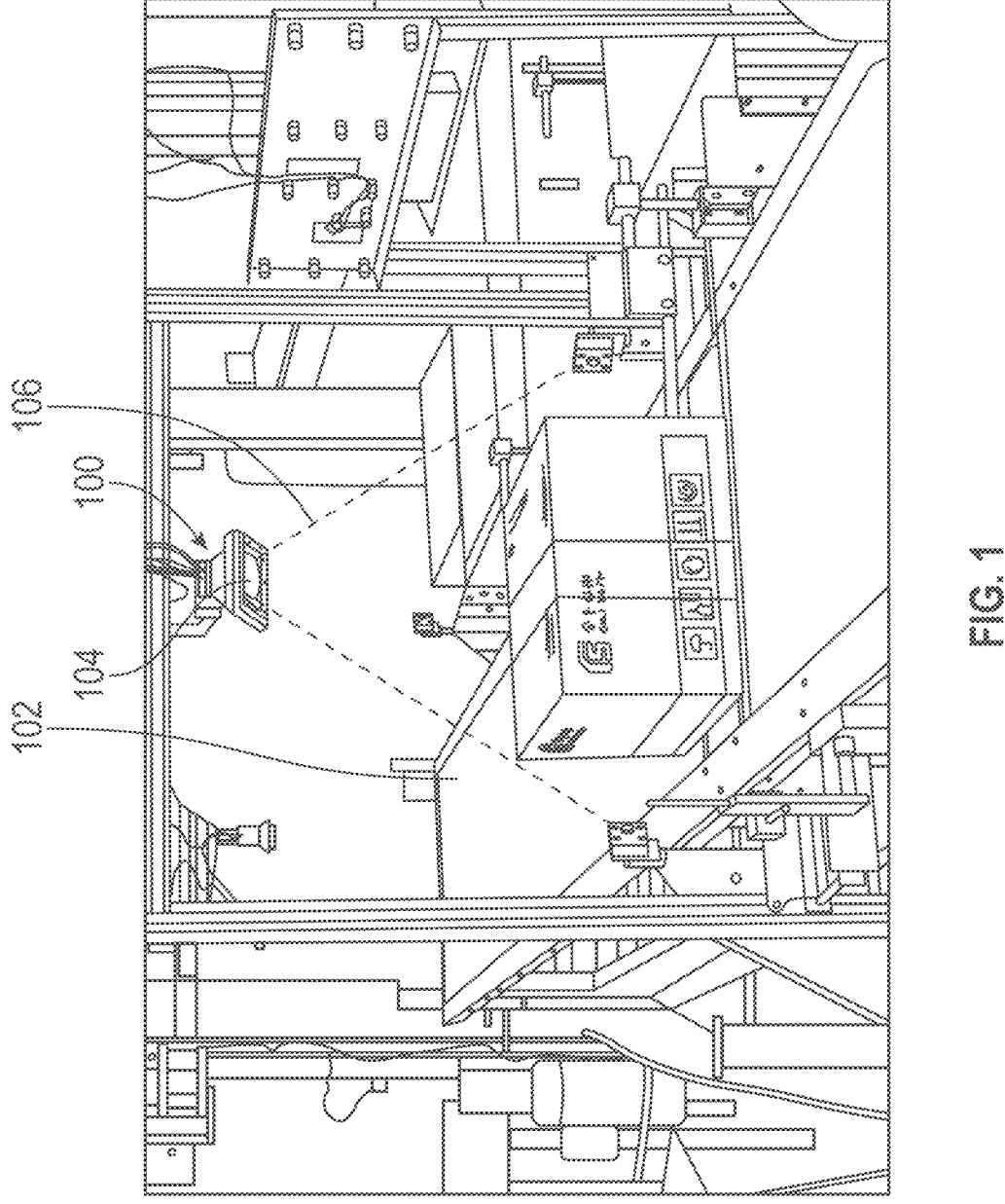
FIG. 1 is an illustration of an illustrative logistics system, in this case part of a packaging operation that includes a conveyor belt and an illustrative optical imaging system.

Referring to FIG. 1, an illustration of an illustrative logistics system 100, in this case part of a packaging operation that includes a conveyor 102, and an illustrative optical imaging system 104 is shown. In the embodiment of FIG. 1, the optical imaging system 104 is a barcode scanner system (e.g., a scanner assembly, a barcode reader, a 2D imager, etc.) for product imaging and/or for object identification. The system 104 may be configured to image and decode machine-readable indicia (e.g., barcodes, quick response (QR) codes, or other machine-identifiable images) from a distance away from an object, and to identify the object based on information decoded from the machine-readable indicia. For example, the system 104 may be configured to be installed in a retail logistics environment to image products and/or product packaging labels for product identification and tracking purposes. The optical imaging system 104 may operate as a stand-alone device or in communication with a remote device, such as a controller (not shown) of the logistics system 100. The optical imaging system 104 may be a stationary barcode scanner that is positioned above or alongside of the conveyor 102 or other end-of-line packaging operation. Alternatively, the system 104 may be mounted to a movable platform (e.g., a forklift, etc.) to facilitate object identification and/or tracking while moving. In yet other embodiments, the system 104 may be used to facilitate other forms of interlogistics traceability. In other embodiments, the principles described herein may be integrated into a handheld optical system (e.g., a handheld barcode scanner system, etc.). The system 104 may have a field-of-view (FOV) 106 within which images (e.g., still images or video) can be taken. The system 104 may also include focus, zoom, and/or other adjustable optical components that enables proper configuration for operating in the logistics system 100. The system 104 may incorporate or have added thereto a printed circuit board (PCB) piezoelectric motor (see FIGS. 3-5) to enable remote and/or automatic setup of adjustable optical function(s) of the system 104, as further described herein.

Figure 2A:
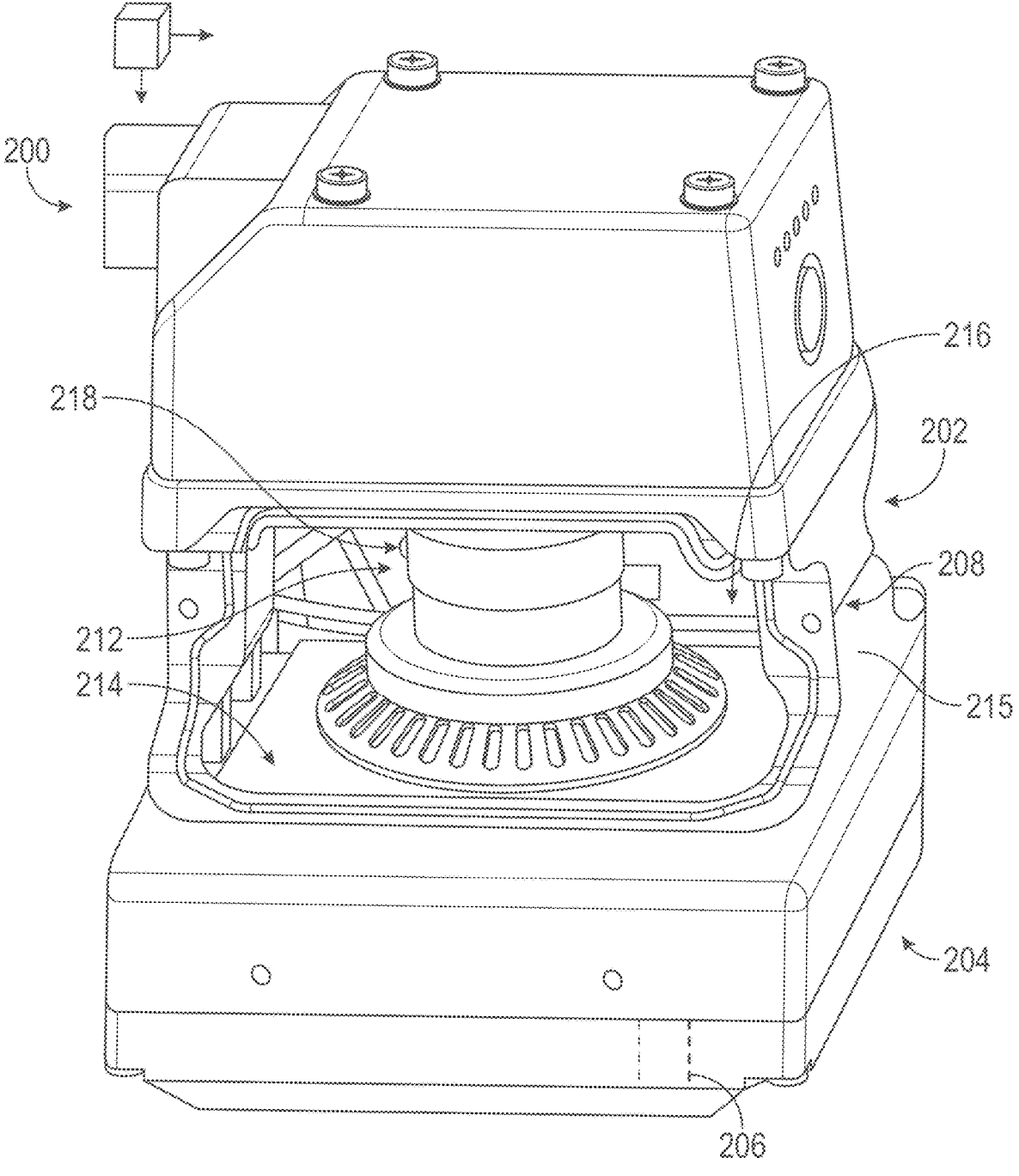
FIG. 2A is an isometric view of an illustrative optical imaging system, in this case a barcode scanner system.
Figures 2B, 2C:
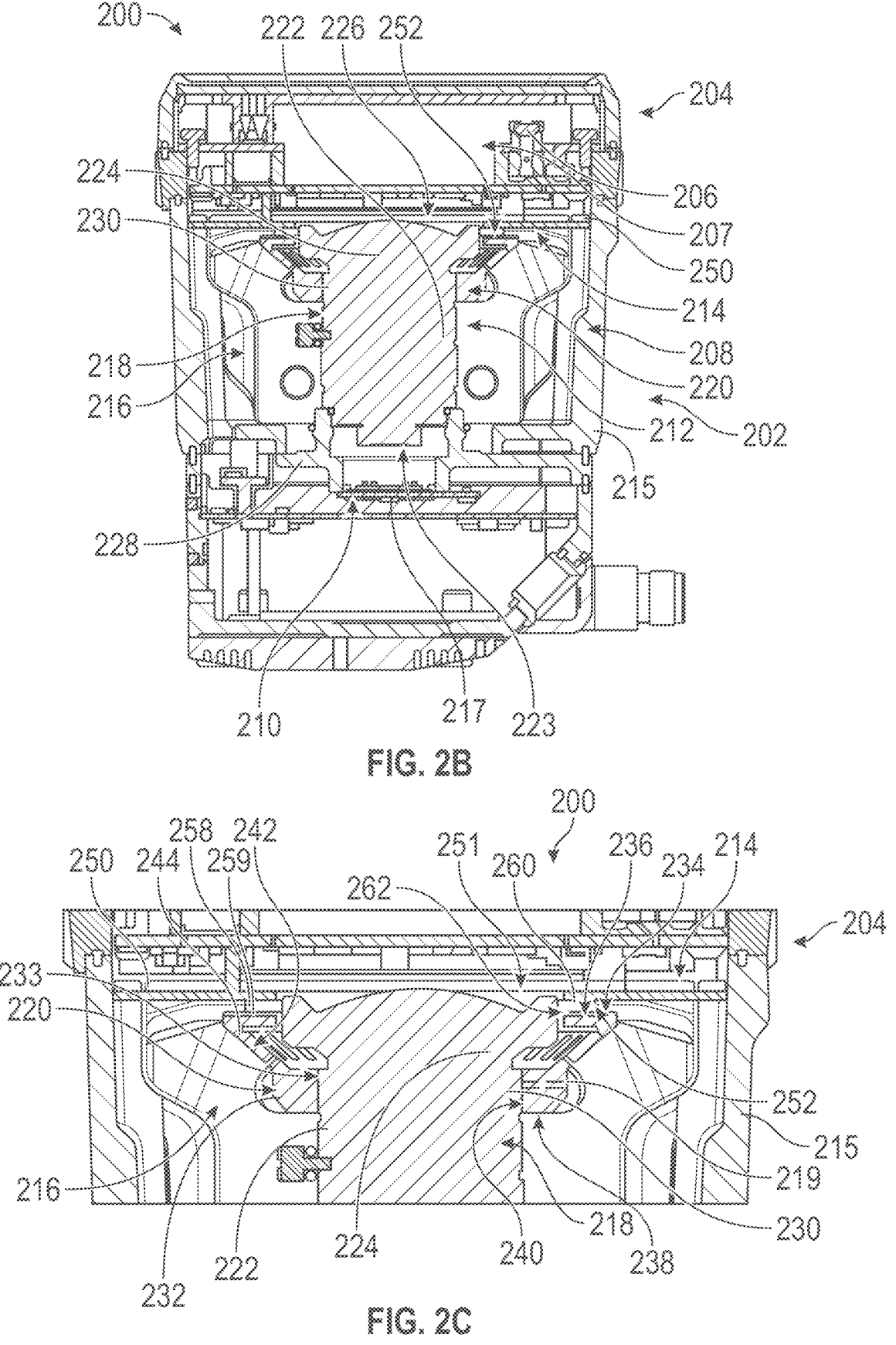
FIG. 2B is a side cross-sectional view of the barcode scanner system of FIG. 2A.
FIG. 2C is a side cross-sectional view of a portion of the barcode scanner system of FIG. 2A.

FIG. 2A is an illustration of an optical imaging system 200 that may be used as the imaging system in FIG. 1. The system 200 may include a reader assembly 202 and an illuminator assembly 204 that is coupled to the reader assembly 202. As shown in FIG. 2A, the illuminator assembly 204 may be configured to illuminate or otherwise direct light toward a target object, such as a product or product packaging label, to facilitate imaging operations of machine-readable indicia. The illuminator assembly 204 may include a light element 206 and may be configured to direct light generated by the light element 206 within a scene and FOV of the system 200 toward the target object (e.g., at least one product and/or product packaging label, etc.). The light element 206 may include at least one light emitting diode (LED) or another form of light source, an illuminator support structure (e.g., a printed circuit board, electrical conductors, an illuminator housing, etc.) to support the light element 206, and/or a cover to prevent the light element 206 from being damaged during operation. As shown in FIG. 2B, the light element 206 may include multiple LEDs positioned around (e.g., circumferentially surrounding, etc.) a central aperture 207 (e.g., opening, etc.) through which light is allowed to pass through the cover and/or illuminator support structure to the reader assembly 202.

The reader assembly 202 may be coupled to the illuminator assembly 204 and may be configured to capture and interpret images of a target object. The reader assembly 202 may include a scanner support structure 208, an imaging device 210, a lens assembly 212, and an electronic control system 214 (e.g., an electronic focus adjustment system, an automatic focus adjustment system, etc.). In other embodiments, the reader assembly 202 may include additional, fewer, and/or different components.

The scanner support structure 208 is configured (i) to house the various components of the imaging device 210, the lens assembly 212, and the electronic control system 214, and (ii) to shield sensitive optical equipment and control processing components from damage. As shown in FIG. 2A, the scanner support structure 208 may include a scanner housing 215 defining an interior cavity 216 that is sized to receive the imaging device 210, the lens assembly 212, and/or the electronic control system 214 therein. The scanner housing 215 may include at least one shield or cover (e.g., along a sidewall of the scanner housing 215, etc.) that is removable from scanner housing 215 to access the interior cavity 216.

The imaging device 210 is configured to capture an image of a scene including image machine-readable indicia, such as one or more linear or 2D printed codes on a product or product packaging label, within a field-of-view of the lens device 218. As shown in FIG. 2B, the imaging device 210 is coupled to the scanner support structure 208 and is positioned to receive light through the lens assembly 212. The imaging device 210 may be arranged coaxial with the lens assembly 212. The imaging device 210 may be spaced axially apart from the lens assembly 212 to thereby reduce the risk of damage to the imaging device 210 during operation. In some embodiments, the imaging device may form part of the electronic control system 214 that is used to control adjustment of the lens assembly 212. The imaging device 210 may include an image sensor 217 that is configured to detect and convey information used to make an image. The image sensor 217 may be a charge-coupled device (CCD), an active-pixel sensor (CMOS), or another form of electronic image sensor.

The lens assembly 212 may be disposed within the interior cavity 216 and be coupled to the scanner support structure 208. For example, the lens assembly 212 may be directly and fixedly coupled to an interior surface and/or support of the scanner housing 215. The lens assembly 212 is configured to focus light that is received through the illuminator assembly 204 (e.g., light that is reflected off of a target object on which machine-readable indicia are located, etc.) and to direct the focused light toward an image sensor 217. As further shown in FIG. 2B, the lens assembly 212 includes a lens device 218 and an adapter ring 220. The lens device 218 is configured to receive and focus the light entering the reader assembly 202 through the aperture 207 to enable clear imaging of the target object (e.g., to reduce blurriness of the target object, barcode, etc.).

The lens device 218 may include a casing 222, an adjustable optical component 224 coupled to the casing 222, and a rotatable feature 230 (e.g., a rotatable element, a rotatable structure, a focus ring, a lens ring, etc.). The adjustable optical component 224 may include, for example, a focus lens and/or an iris and/or a zoom optical component that is physically adjustable. The lens device 218 may be a C-mount lens that includes a male thread at a distal end 223 of the lens device 218 that is configured to mate or otherwise engaged with a female thread on a camera. In other embodiments, the lens device 218 may include a different lens mount structure. For example, the lens device 218 may include an S-mount lens having a specific thread pitch for the male thread on the lens device 218. In other embodiments, the lens device 218 may include a different type of lens mount feature and/or may be a custom designed lens, such as a dynamic focus lens or another lens type.

The adjustable optical component 224 may be movably coupled to the casing 222 via the rotatable feature 230 (e.g., a rotatable element, a rotatable structure, etc.). The rotatable feature 230 may be electromechanical, electromagnetic, mechanical, and/or otherwise, and may be configured with sufficient moveable force so as to alter position of the adjustable optical component 224. For example, the rotatable feature 230 may be part of a cam system or another form of position adjustable mount that is configured to adjust a position and/or orientation of the optical component 224 with respect to the casing 222 (e.g., linear translation of the optical component 224 along a central axis of the casing 222 toward or away from the target object, etc.). As shown in FIG. 2B, a distal end 223 of the casing 222 may be fixedly coupled to an end wall 228 of the scanner housing 215 or another interior wall so that the casing 222 is stationary relative to the scanner housing 215. In another embodiment, the casing 222 may be coupled to the scanner housing 215 at an intermediate position along the casing 222 between the distal end 221 and a proximal end 226 of the casing 222. As shown in FIGS. 2B and 2C, the lens assembly 212 is arranged coaxial with the aperture 207 so as to receive light therethrough.

The rotatable feature 230 may include a focusing ring of the lens device 218 that is rotatable relative to the casing 222 and that is configured to move the optical component 224 via rotation of the rotatable feature 230 relative to the casing 222. The rotatable feature 230 may be a cylindrically shaped adjustment ring that is slidably engaged with the casing 222. The rotatable feature 230 may be disposed at an intermediate axial position along the casing 222 between opposing ends of the casing 222 (e.g., a central position approximately one fourth, one third, or one half, etc.) of the way between opposing ends of the casing 222). The adapter ring 220 may be engaged to the rotatable feature 230 and may be configured to rotate the rotatable feature 230 under an applied force. The rotatable feature 230 may be part of a position adjustment assembly that is configured to manipulate a position (e.g., an axial position, etc.) of the optical component 224 within the casing 222 in response to the rotation so as to bring images of the target object into focus. As such, the adapter ring 220 may form part of a position adjustment assembly for the lens assembly 212. The position adjustment assembly may be configured to be remotely controlled and/or automatically controlled to adjust the position of the optical component 224, as further described herein.

The adapter ring 220 may form part of a focus adjustment system for the reader assembly 202 that is configured to adjust a position of the optical component 224 without manual manipulation of the lens device 218 by a user. As shown in FIGS. 2B and 2C, the adapter ring 220 may be fixedly coupled to the rotatable feature 230 of the lens device 218 so as to control rotation of the rotatable feature 230.

Figure 2D:
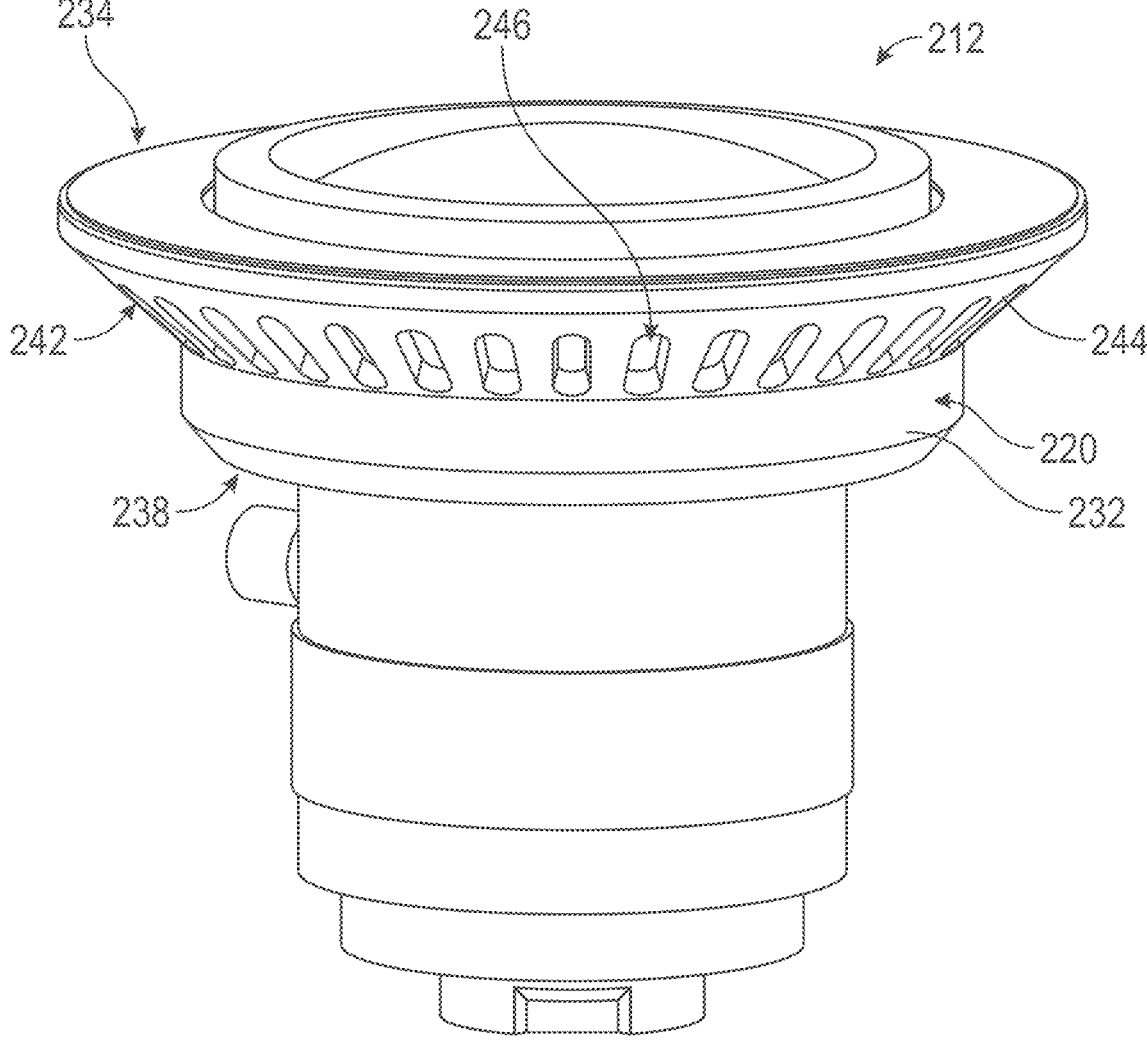
FIG. 2D is an isometric view of an illustrative lens assembly of the barcode scanner system of FIG. 2A, where the lens assembly includes a lens device with an adapter ring engaged thereto.

As further shown in FIGS. 2C and 2D, the adapter ring 220 may include a main body 232 having a first end 234 (e.g., an upper end, etc.) defining an axially-facing support surface 236 (e.g., an end surface, etc.), and an opposing second end 238 (e.g., a lower end, etc.) defining a radially-inward facing support surface 240. The radially-inward facing support surface 240 may define an opening 233 at a central position along the main body 232 that extends axially therethrough between the first end 234 and the second end 238. The main body 232 may also include a support element 242 that extends between the first end 234 and the second end 238 of the main body 232. As shown in FIG. 2C, the support element 242 may include an angled wall 244 extending from the first end 234 in both an axial and radial direction toward the second end 238 so that an outer surface of the adapter ring 220 is frustoconical. Alternative configurations of the outer surface of the adapter ring 220 are also possible. As shown in FIG. 2D, the angled wall 244 may define a plurality of windows 246 that are configured to allow airflow through the adapter ring 220, which can facilitate cooling of electronic components and reduce the weight of the adapter ring 220.

As shown in FIG. 2C, the lens device 218 may be axially aligned with the opening 233 and may be at least partly disposed within the opening 233. The adapter ring 220 may be sized so that there is a friction fit between a radially-inward facing support surface 240 of the adapter ring 220 and the rotatable feature 230. In other embodiments, the adapter ring 220 may include a gasket, sleeve, or another form of pliable engaging member disposed radially between the adapter ring 220 and the rotatable feature 230 of the lens device 218. In yet other embodiments, a connector element, such as a pin 219 (e.g., a dowel, a set screw, or another fastener), protrusion(s)/recession feature(s), clip or other mechanism, may enable the adapter ring 220 to be securely engaged to the rotatable feature 230. The adapter ring 220 may circumscribe the lens device 218 so as to nestably and fixedly engage the rotatable feature 230. In other embodiments, the adapter ring 220 may only engage with a circumferential portion of the rotatable feature 230. In yet other embodiments, the adapter ring 220 may engage a protrusion or another interface that is fixedly coupled to the rotatable feature 230. In yet further embodiments, the adapter ring 220 may be another form of adapter element that engages and extends between the rotatable feature 230 and a portion of the electronic control system 214 (FIG. 2A).

The electronic control system 214 may be configured (i) to remotely control and/or automatically control a position of the adjustable optical component 224, and (ii) to image and decode machine-readable indicia on a target object. As shown in FIG. 2B, the electronic control system 214 may include a printed circuit board (PCB) 250, a PCB piezoelectric motor 252 (see also FIGS. 3 and 4), and control circuitry for the piezoelectric motor 252. In some embodiments, the electronic control system 214 may also include the imaging device 210.

The PCB 250 may be fixedly coupled to the scanner support structure 208. For example, the PCB 250 may be fastened or otherwise attached or mounted to an end wall and/or sidewall of the scanner support structure 208. In other embodiments, the PCB 250 may be fixedly coupled to a fixed position structure of the lens device 218, such as the casing 222 of the lens device 218. Still yet, the PCB 250 may be slotted within guides that define a slot to retain the PCB 250. As shown in FIG. 2C, the PCB 250 may define a through-hole opening 251 that extends axially therethrough to allow light to pass through the PCB 250 to the lens device 218. The lens device 218 may be aligned with the opening 251 so as to receive light through the opening 251. In some embodiments, at least a portion of the lens device 218 extends through the opening 251. The lens device 218 may be formed of one or more optical components, and include at least one adjustable optical component.

Figures 3, 4, 5:
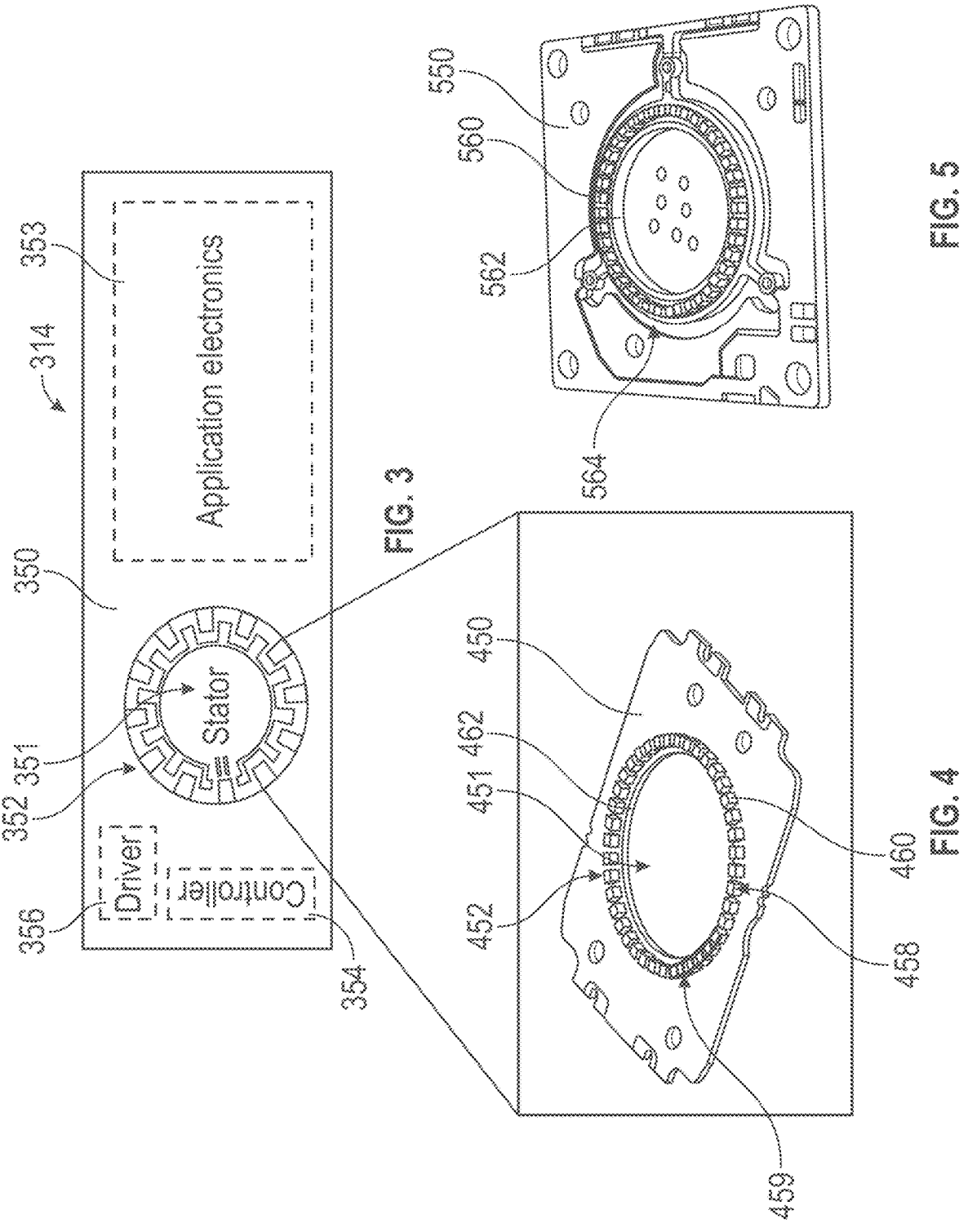
FIG. 3 is a top view of an illustrative printed circuit board (PCB) for a barcode scanner system including a PCB piezoelectric motor and supporting electronics.
FIG. 4 is an isometric view of an illustrative PCB piezoelectric motor that may be disposed on the PCB of FIG. 3.
FIG. 5 is an isometric view of another illustrative PCB piezoelectric motor.

FIG. 3 is an illustration of an illustrative electronic control system 314 that may be used in the system 200 of FIGS. 2A-2D. The electronic control system 314 includes (i) a PCB 350, (ii) a piezoelectric motor 352, and (iii) control circuitry 353 including a controller 354, and a driver 356. In some embodiments, the PCB 350 (e.g., the control circuitry 353) may be configured to be electrically connected to and in communication with an imaging device, such as imaging device 210 of FIG. 2B, and may be configured to control operation of the imaging device and/or processing of image data received from the imaging device. In some embodiments, the electronic control system 314 may further include an optical encoder or another form of position tracking device to control operation of the piezoelectric motor 352 in response to user input, and/or based on image data from the imaging device, as will be further described hereinbelow. In operation, a traveling wave may be produced by the stator 351 as each element of the stator may have a surface particle that has an orbital motion. The driver 356 may be disposed on the PCB 350 and may be configured to power the piezoelectric motor 352 by applying a rotational current and/or voltage to the piezoelectric motor 352 to control a direction of rotation and/or rotational speed.

As shown in FIG. 4, the piezoelectric motor may be a PCB piezoelectric motor 452 that is integrally formed with, or disposed on, a PCB 450 so that the piezoelectric motor 452 cannot be disconnected or otherwise separated from the PCB 450 without damaging the PCB 450 and/or the piezoelectric motor 452. The piezoelectric motor 452 includes a stator 458 that mounted to the PCB 450, and a rotor 459 that is rotationally coupled to the stator 458. The piezoelectric motor 452 may be embedded onto the PCB 450. Specifically, the stator 458 may include multiple piezo elements 460 (e.g., piezoelectric crystals, piezo-ceramic elements, etc.) that are embedded into or otherwise attached to the PCB 450, such as via a soldering operation or otherwise. The piezo elements 460 may be disposed along a perimeter 462 of the opening 451 so as to at least partly surround the opening 451. The piezo elements 460 may be spaced apart from one another at approximately equal increments along the perimeter 462 of the opening 451. In some embodiments, as shown in FIG. 5, piezo elements 560 of a piezoelectric motor may be disposed on a stator ring portion 562 of a PCB 550 that is spaced radially apart from other portions of the PCB 550 (e.g., by an annular air gap 564, etc.), thereby reducing electrical interference that could otherwise be transmitted to other parts of the PCB 550. It should be appreciated that the arrangement and number of piezo elements 560 may be different in various embodiments.

Returning to FIG. 2C, the piezoelectric motor 252 may be configured to control adjustment of the optical component 224. The piezoelectric motor 252 includes a stator 258 and a rotor 259 that is configured to rotate relative to the stator 258. The rotor 259 may be configured as a ring-shaped panel, such as a ring plate, that is disposed axially between the adapter ring 220 and the stator 258. The ring plate may define a central opening 262 having a similar size as the opening 251 of the PCB 250 and that is coaxially aligned with the opening 251 in the PCB 250 to allow light to pass freely therethough and to the lens assembly 212.

The rotor 259 is configured to rotate the adapter ring 220 when the piezoelectric motor 252 is activated to apply a rotational force to the focus ring (e.g., when the piezoelectric motor is in an ON state, when a rotational current and/or voltage is applied to the stator 258, etc.). A first axial side of the rotor 259 is configured to be engaged with the stator 258. A second axial side of the rotor 259 is configured to be engaged with the axially-facing support surface 236 of the adapter ring 220 so that applying rotational energy to the stator 258 causes the rotor 259 and the adapter ring 220 to rotate, thereby moving the rotatable feature 230 to cause the optical component 224 to be adjusted (e.g., moved axially and linearly forward and backward within the lens device 218). The piezo elements 260 may be tensioned so that applying rotational energy to the stator 258 causes generation of a traveling wave along the piezo elements 260 to induce movement of the rotor 259 with respect to the piezo elements 260. By proper application of energy to the piezo elements 260, rotor movement can be quickly and precisely controlled. By using a PCB piezoelectric motor 252, the optical imaging system 200, for example, may be reduced in size relative to inclusion of other rotational motors.

The rotor 259 may be fixedly coupled to the adapter ring 220. For example, the rotor 259 may be fastened to the adapter ring 220 via screws or an adhesive product. In other embodiments, the rotor 259 may cause movement of the adapter ring 220 via frictional engagement between the rotor 259 and the axially-facing support surface 236 of the adapter ring 220 (e.g., the rotor 259 may be made from, or at least partially coated with, a material having a high coefficient of friction, or may include an intervening material between the rotor 259 and the adapter ring 220 having a high coefficient of friction, etc.). In yet other embodiments, the rotor 259 may be integrally formed with the adapter ring 220 that cannot be separated without damaging the rotor 259 or the adapter ring 220. For example, the adapter ring 220 may be made from a plastic material that is overmolded or otherwise formed onto the rotor 259. The rotor 259 may be made from a metal or plastic material that is at least partially coated with a layer of a lower durometer material (e.g., along the first axial side of the rotor 259 that faces the stator 258). The lower durometer material may be a polyurethane rubber or another material that is configured to facilitate relative movement between the rotor 259 and the stator 258.

Figure 6:
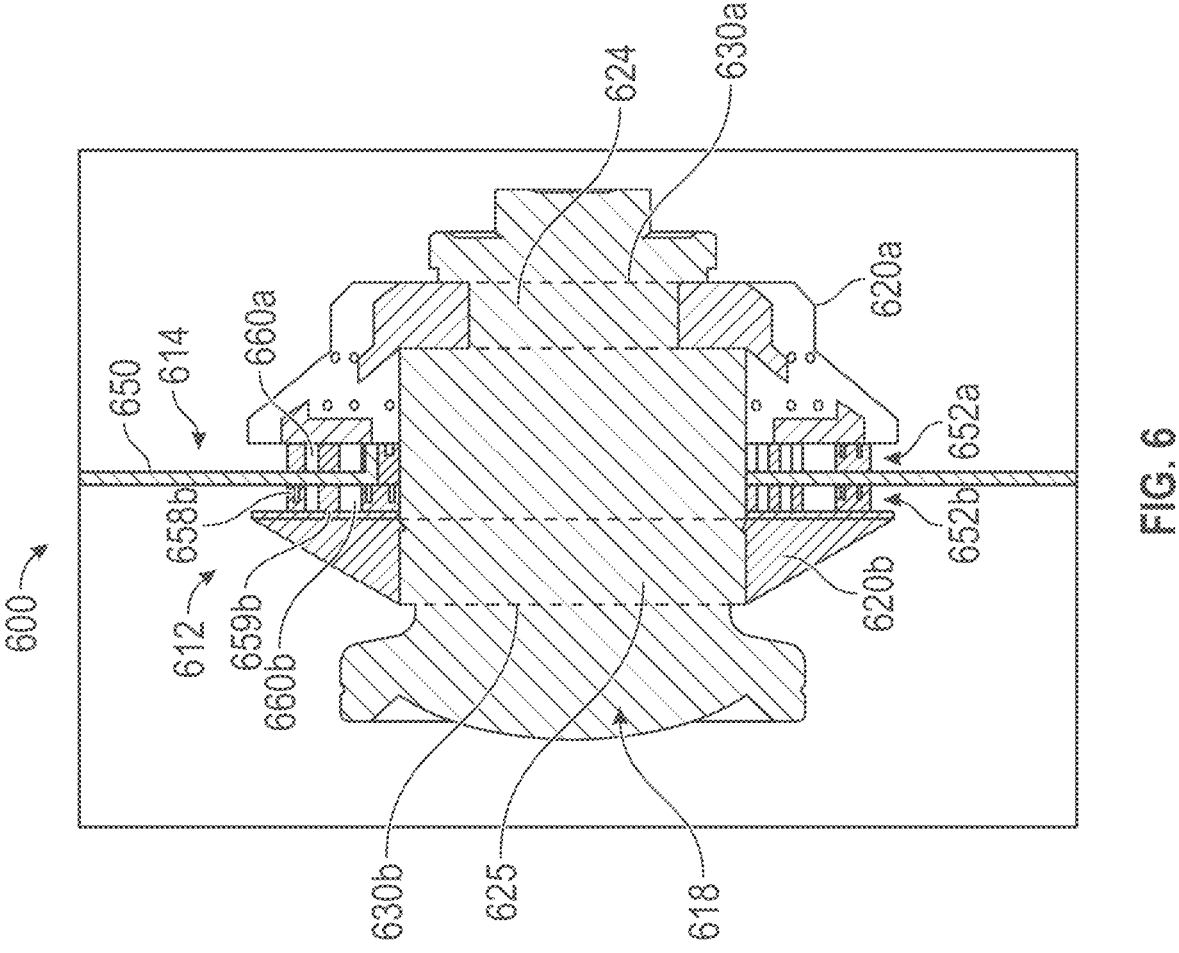
FIG. 6 is a side cross-sectional view of an illustrative electronic focus adjustment system for a barcode scanner.

The design and arrangement of the optical imaging systems described with respect to FIGS. 1, 2A-2D, and 3-5 are provided for illustrative purposes only. It should be appreciated that many alterations are possible without departing from the inventive principles disclosed herein. For example, FIG. 6 shows a portion of an optical imaging system 600 that is configured to control multiple optical components. The system 600 includes a lens assembly 612 including a lens device 618 and multiple adapter rings 620a, 620b. The adapter rings 620a, 620b are configured to manipulate different portions of the lens device 618 to cause adjustment of different optical parameters.

For example, the adapter rings 620a, 620b may be configured to interface with rotatable features of the lens device 618, shown as first rotatable feature 630a (e.g., a first rotatable component, a first focus ring, a first lens ring, etc.) and second rotatable feature 630b (e.g., a second rotatable component, a second lens ring for iris or zoom, etc.). The first rotatable feature 630a may be configured to control a first adjustable optical component 624 of a lens device 618, such as a first focus lens and/or a first aperture of the lens device 618. The second rotatable feature 630b may be configured to control a second adjustable optical component 625 of the lens device 618, such as a second focus lens and/or a second aperture of the lens device 618 that is separate from the first adjustable optical component 624. In other embodiments, at least one of the first and second optical components may be configured to adjust a position of the lens device 618 relative to the imaging device.

The system 600 may also include an electronic control system 614 that is configured to control rotation of the adapter rings 620a, 620b to thereby focus or otherwise adjust the lens device 618. The electronic control system 614 may include a PCB 650 that includes multiple piezoelectric motors, shown as first piezoelectric motor 652a for causing rotation of the first adapter ring 620a and a second piezoelectric motor 652b for causing rotation of the second adapter ring 620b. In some embodiments, as shown in FIG. 6, the first piezoelectric motor 652a and the second piezoelectric motor 652b may be disposed on opposing sides of the PCB 650 (e.g., a first side and an opposing second side of the PCB 650, etc.), to facilitate manipulation of different features of the lens device 618 while minimizing the space claim of the electronic control system within the scanner housing (e.g., due to the use of only a single PCB 650). In such an arrangement, the PCB 650 may be disposed at an intermediate position along the lens device 618, and axially between the rotatable features 630a, 630b. In other embodiments, both of the piezoelectric motors 652a, 652b may be disposed on the same side of the PCB 650, but at different radial positions along the PCB 650. For example, the first piezoelectric motor 652a may be disposed proximate to an opening in the PCB 650 (e.g., adjacent to a perimeter of the opening, etc.) and the second piezoelectric motor 652b may surround the first piezoelectric motor 652a. The second piezoelectric motor 652b may be arranged concentric with the first piezoelectric motor 652a and the opening in the PCB 650. It should be appreciated that, in such an arrangement, the number of piezo elements 660a, 660b for each piezoelectric motor may be different to thereby enable the application of different forces to different features of the lens device 618. In other embodiments, the piezoelectric motors 652a, 652b may be disposed on different regions of the PCB 650 that are spaced apart from one another.

As shown in FIG. 6, the second piezoelectric motor 652b may have a similar design as the first piezoelectric motor 652a, and as other piezoelectric motors designs described herein (for example, as described with reference to FIGS. 2A-2D). The second piezoelectric motor 652b may include a second stator 658b that is formed into the PCB 650, and a second rotor 659b that is rotationally coupled to the second adapter ring 620b so as to rotate the second adapter ring 620b when the second piezoelectric motor 652b is activated to apply a rotational force to the second adapter ring 620b (e.g., when a rotational current and/or voltage is applied to the second stator 658b).

Figure 7:
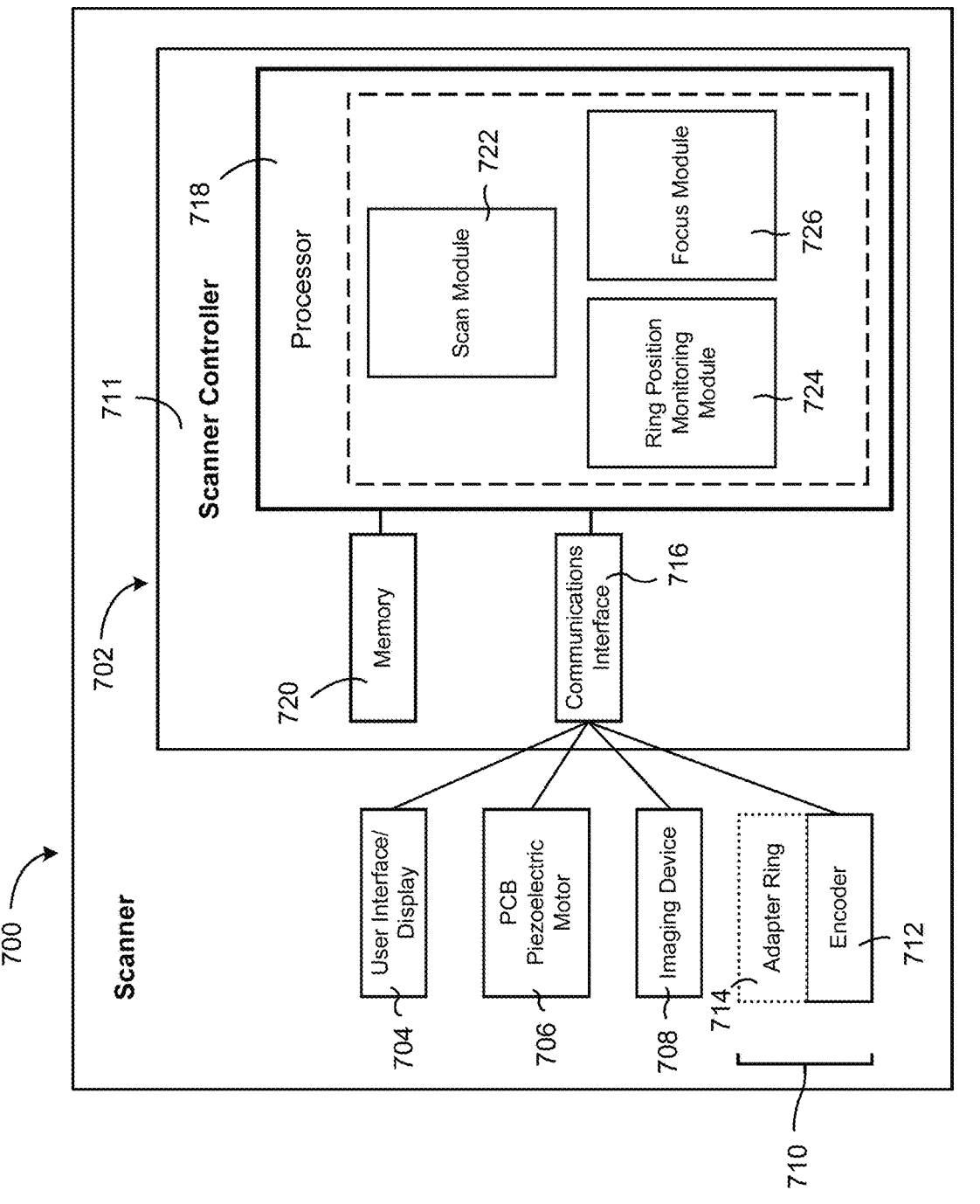
FIG. 7 is a block diagram of an illustrative control system for a barcode scanner inclusive of a PCB piezoelectric motor configured to rotate a rotatable element to adjust an optical component of the barcode scanner.

The electronic control system may be configured to enable remote and/or automatic adjustment of the focus of the lens device 618 so as to be independent of manual manipulation of the lens device 618 by a user. FIG. 7 shows an illustrative optical imaging system 700 that includes an electronic control system 702 (and which may be used in any of the systems described herein). The electronic control system 702 may include a user interface 704, at least one PCB piezoelectric motor 706, an imaging device 708, a lens assembly 710, and a controller 711 (e.g., a scanner controller, etc.).

The user interface 704 may include a display, such as a touchscreen display, or another form of I/O interface that is configured to receive user inputs and to provide performance-related data regarding the system 700. The performance-related data may include an indication of a position of at least one adjustable optical component of the lens, image data (e.g., an image of a scene including machine-readable indicia, information based on decoding of the machine-readable indicia, etc.).

In some embodiments, the system 700 may also include a position sensor, such as an optical encoder 712 which may be fastened or otherwise coupled to an adapter ring 714 of the lens assembly 710, PCB, or another component so as to monitor movement of the adjustable optical component of the lens. The position sensor may be configured (i) to measure a relative position of the adapter ring 714 with respect to the PCB and/or another component of the system 700 and (ii) to transmit rotational position data to a processor of the electronic control system 702, as will be further described hereinbelow. In some embodiments, the system 700 may be configured to query the position sensor periodically and to determine a level of drift or positional misalignment that may occur due to vibrations, aging, temperature, and/or other causes, and to reposition the adapter ring 714 to prevent loss of focus during operation or between uses.

The controller 711 is configured to control operation of the optical imaging system 700 as well as remote and/or automatic adjustment of the focus of the lens assembly 710. The controller 711 may include a communication interface 716, a processor 718, and memory 720.

The communication interface 716 may be communicably coupled to the user interface 704, the at least one PCB piezoelectric motor 706, the imaging device 708, and the position sensor (e.g., the optical encoder 712), and may be configured to coordinate communications between each of these components and the controller 711. The communication interface 716 may include a network interface card, a transceiver, and/or other electronic communications equipment.

The processor 718 is communicably coupled to the memory 720 and the communication interface 716 and is configured to control (i) remote and/or automatic adjustment of at least one optical parameter of the lens, and (ii) image capture and analysis of machine-readable indicia. Memory 720 stores various instructions that, when executed by the processor, control at least partly the operation of various components and/or subsystems of the optical imaging system 700. As shown in FIG. 7, the controller 711 also includes various module and/or control circuits. For example, the controller 711 may include a scan module 722, a ring position monitoring module 724, and a focus module 726. These modules may be embodied as machine or computer-readable media that is executable by the processor 718 and may include instructions (e.g., code) to guide operation of the processor 718. In another embodiment, the modules may be implemented as hardware units, such as electronic control units, and may include circuitry components for accomplishing any of the operations described herein. In other embodiments, the controller 711 may include additional, fewer, and/or different modules to enable the various functionalities of the optical imaging system 700.

The scan module 722 may be configured to control operation of the imaging device 708 to capture an image of a scene within a field-of-view of the lens. For example, the scan module 722 may be configured to transmit a command to the imaging device 708 in response to user input, or in a preprogrammed sequence (e.g., periodically based on a sampling rate from memory 720, etc.) to thereby allow movement of target objects through a production line or another logistics operation. The scan module 722 may be configured to display the captured image on the user interface 704. The scan module 722 may also be configured to decode or otherwise process the captured images to determine at least one optical parameter, which may be, for example, an indication of focus of the scene (e.g., an amount of blurriness, an amount of change in focus, or another characteristic of the image data of the scene). The scan module 722 may also be configured to determine identification data from the captured image, such as at least one barcode, QR code, or other machine-identifiable code.

The ring position monitoring module 724 is configured to determine a position of at least one adjustable optical components of the lens. For example, the ring position monitoring module 724 may be communicably coupled to the position device, and may be configured to receive and interpret sensor data from the position device. The ring position monitoring module 724 may be configured to determine a relative position of the adjustable optical component based on the sensor data. For example, the ring position monitoring module 724 may be configured to determine (e.g., based on sensor data indicating a relative position of the adapter ring) an amount of adjustment as a percentage of the full range of adjustment of the optical component.

The focus module 726 may be configured to adjust a focus of the lens (i) in response to user input and/or (ii) automatically based on data from the scan module 722 and/or the ring position monitoring module 724. For example, the focus module 726 may be configured to receive commands from the user interface 704 to reposition the at least one adjustable optical component of the lens. The command may include a percentage adjustment, and/or a direction of adjustment. For example, the focus module 726 may be configured to receive, from the user interface 704, a target rotational angle of a rotational feature of the lens. The focus module 726 may be configured to transmit a drive command to the at least one PCB piezoelectric motor 706 in response to the target rotational angle (e.g., the command). The focus module 726 may be configured to receive from the position sensor, an angular rotation of the adapter ring 714 during rotation, and to generate a stop signal to stop rotation in response to an indication that the angular rotation of the adapter ring 714 satisfies (e.g., is approximately equal to, etc.) the target rotational angle. In some embodiments, the focus module 726 may be configured to automatically adjust focus of the lens and/or another optical characteristic based on image data from the scan module 722, as will be further described hereinbelow.

FIG. 8 is a flow diagram that shows an illustrative method 800 of operating an optical imaging system and/or for performing automatic focus adjustment of the optical imaging system. The method 800 may be performed using the controller 711 of the optical imaging system 700 of FIG. 7.

At operation 802, a controller of the optical imaging system receives an optical parameter from an imaging device. Operation 802 may include receiving image data from an imaging device including image data associated with a field-of-view of the imaging device. Operation 802 may include decoding the image data to determine at least one optical parameter. For example, operation 802 may include determining an indication of focus of the scene based on the image data (e.g., an amount of blurriness of the scene, an amount of change in focus relative to a historical value in memory, or another characteristic of the image data).

At operation 804, the controller generates, based on the optical parameter, a drive signal to command rotation of a rotor of at least one PCB piezoelectric motor of the optical imaging system. Operation 804 may include determining an amount of adjustment to be made based on the optical parameter. For example, the controller may be configured to determine the amount of adjustment by iterating through a lookup table that includes values of focus adjustment and/or an optical focus adjustment position as a function of the optical parameter. Operation 804 may include communicating a control signal to a driver of the PCB piezoelectric motor to cause movement (e.g., rotation, etc.) of the adjustable optical component.

At operation 806, the controller, via the driver, may apply rotational energy to a stator of the PCB piezoelectric motor in response to the drive signal to adjust the optical component until the optical parameter satisfies one or more optical parameter criteria. Operation 706 may include supplying power to the driver, which in turn causes rotation of an adapter ring that is coupled to a position adjustment feature of the adjustable optical component (e.g., a rotation feature, etc.). Operation 806 may include repeatedly determining the at least one optical parameter and communicating control signals to the driver to drive the PCB piezoelectric motor until the at least one optical parameter satisfies the optical parameter criteria, such as by being within a threshold range of the optical parameter criteria or by exceeding the optical parameter criteria. Operation 806 may include deactivating the driver in response to an indication that optical parameter satisfies the optical parameter criteria.

In some embodiments, the method 800 may include adjusting multiple optical components of a lens assembly using a plurality of PCB piezoelectric motors to achieve the optical parameter criteria. The adjustable optical components may include, for example, a first movable lens, a second movable lens, an aperture, or another mechanism or device affecting image quality. For example, the method 800 may include applying rotational energy to a stator of a second PCB piezoelectric motor in response to the drive signal from the controller to adjust a second optical component of a lens device until the optical parameter is within a second threshold range of the optical parameter criteria (see operation 808 of FIG. 8), or until a second optical parameter satisfies a second optical parameter criteria that is different from optical parameter criteria in operation 806.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of a preferred embodiment for implementing the invention, and the scope of the invention should not necessarily be limited by this description. The scope of the present invention is instead defined by the following claims.

What is claimed is:

1. An optical imaging system, comprising:
a lens device including an adjustable optical component moveable via a rotatable feature;
an adapter ring engaged to the rotatable feature of the lens device;
a printed circuit board (PCB) piezoelectric motor including:
a PCB defining an opening extending therethrough; and
a stator mounted to the PCB along a perimeter of the opening; and
a rotor configured to rotate relative to the stator, the rotor disposed axially between the adapter ring and the stator, the rotor coupled to the adapter ring so that applying rotational energy to the stator causes the rotor and the adapter ring to rotate about the opening of the PCB, thereby moving the rotatable feature to cause the adjustable optical component to be adjusted.

2. The system according to claim 1, wherein the adjustable optical component includes a focus lens and/or an iris and/or a zoom adjustment.

3. The system according to claim 1, wherein the rotatable feature is a focusing ring of the lens device.

4. The system according to claim 1, further comprising a structure to which the PCB piezoelectric motor is fixedly mounted such that rotation of the rotor is relative to the structure.

5. The system according to claim 1, further comprising a structure to which the lens device is fixedly mounted, and wherein the stator of the PCB piezoelectric motor is attached to a fixed position structure of the lens device, and wherein the PCB includes a first side and a second side in parallel with the first side, the first and second sides oriented along a plane that is perpendicular to a central axis of the lens device.

6. The system according to claim 1, further comprising:
an imaging device configured to image a machine-readable indicia within a field-of-view of the lens device; and
a processor configured to decode the machine-readable indicia.

7. The system according to claim 6, wherein the PCB is in electrical communication with the imaging device and/or the processor, the stator including a plurality of piezo elements that are spaced apart from one another along the perimeter of the opening.

8. The system according to claim 1, further comprising:
an imaging device configured to capture an image of a scene within a field-of-view of the lens device;
a processor configured to image process the image to determine at least one optical parameter; and
a driver in electrical communication with the processor and the PCB piezoelectric motor, the processor further configured to communicate control signals to the driver in response to the at least one optical parameter which, in turn, generates and communicates drive signals to the PCB piezoelectric motor to cause the adjustable optical component to rotate.

9. The system according to claim 8, wherein the processor is further configured to repeatedly determine the at least one optical parameter and communicate control signals to the driver to drive the PCB piezoelectric motor until the at least one optical parameter satisfies an optical parameter criteria.

10. The system according to claim 8, wherein the processor and driver are mounted to the PCB.

11. The system according to claim 1, wherein the lens device includes a second adjustable optical component adjustably moveable via a second rotatable feature; and further comprising:
a second adapter ring engaged to the second rotatable feature of the lens device; and
a second PCB piezoelectric motor including:
a second stator mounted to the PCB along the perimeter of the opening and on an opposing side of the PCB relative to the stator; and
a second rotor configured to rotate relative to the stator, the second rotor disposed axially between the second adapter ring and the second stator, the second rotor of the second PCB piezoelectric motor coupled to the second adapter ring and positioned relative to the second rotor so that application of second rotational energy to the second stator causes the second rotor and the second adapter ring to rotate, thereby moving the second rotatable feature to cause the second adjustable optical component to be adjusted.

12. The system according to claim 1, wherein the rotor defines a central opening that is coaxially aligned with the opening in the PCB so as to allow light to pass therethrough to the lens device.

13. A scanner assembly, comprising:
a scanner support structure;
a lens assembly fixedly coupled to the scanner support structure, the lens assembly including:
a lens device; and
a focus ring;
an imaging device positioned to receive light through the lens device; and an electronic control system including:

a printed circuit board (PCB) electrically coupled to the imaging device, the PCB defining an opening extending therethrough;
a processor disposed on the PCB and configured to process images from the imaging device; and
a piezoelectric motor including:
a stator mounted to the PCB along a perimeter of the opening; and
a rotor ring that is disposed axially between the focus ring and the stator, the rotor ring rotationally coupled to the focus ring and electromagnetically coupled to the stator so as to rotate the focus ring about the opening of the PCB when a rotational current is applied to the stator.

14. The scanner assembly of claim 13, further comprising an illuminator including a light element, the illuminator configured to direct light generated by the light element toward a target object, wherein the scanner support structure, lens assembly, imaging device, and electronic control system form part of a reader assembly that is coupled to the illuminator and positioned so that the lens device receives light from the illuminator.

15. The scanner assembly of claim 13, wherein the electronic control system is configured to automatically adjust the focus of the lens device without any manual input from a user.

16. The scanner assembly of claim 13, wherein the rotor ring engages the stator along a viewing direction through the lens device, the rotor ring defining a central opening that is coaxial with the opening, the lens device disposed at least partly within the central opening.

17. The scanner assembly of claim 13, wherein the lens device is aligned with the opening to receive light passing through the opening.

18. The scanner assembly of claim 13, the lens device further comprising a second lens ring, wherein the piezoelectric motor is a first piezoelectric motor disposed on a first side of the PCB, further comprising a second piezoelectric motor disposed on a second side of the PCB, the second piezoelectric motor including a second rotor ring that is rotationally coupled to the second lens ring so as to rotate the second lens ring when a second rotational current is applied to the second piezoelectric motor.

19. The scanner assembly of claim 18, wherein the first piezoelectric motor is arranged concentric with the second piezoelectric motor.

20. A method of operating an optical imaging system, comprising:
receiving, by a controller, an optical parameter from an imaging device;
generating, by the controller, based on the optical parameter, a drive signal to command rotation of a rotor of a printed circuit board (PCB) piezoelectric motor, the PCB piezoelectric motor further including:
a PCB defining an opening extending therethrough;
an adapter ring coupled to the rotor;
a stator mounted to the PCB along a perimeter of the opening, wherein the rotor is disposed axially between the adapter ring and the stator; and
applying rotational energy to a stator of the PCB piezoelectric motor in response to the drive signal to cause the rotor to rotate the adapter ring that is fixedly coupled to a rotatable feature of a lens device about the opening of the PCB so as to adjust an optical component of the lens device until the optical parameter satisfies an optical parameter criteria.

21. The method of claim 20, further comprising:
generating, by the controller, a second drive signal to
    command rotation of a second rotor of a second PCB
    piezoelectric motor arranged concentric with the PCB
    piezoelectric motor in response to a determination that
    the optical parameter is within a first threshold range of
    the optical parameter criteria; and
applying second rotational energy to a second stator of the
    second PCB piezoelectric motor to cause the second
    rotor of the second PCB piezoelectric motor to rotate a
    second adapter ring that is fixedly coupled to a second
    rotatable feature of the lens device so as to adjust a
    second optical component of the lens device until the
    optical parameter is within a second threshold range of
    the optical parameter criteria that is less than the first
    threshold range.

22. The method of claim 20, wherein generating the drive
signal comprises generating a command signal to rotate the
first adapter ring by a target rotational angle, further com-
prising:
    receiving, from an optical encoder coupled to the adapter
        ring, an angular rotation of the adapter ring; and
    generating a stop signal in response to an indication that
        the angular rotation of the adapter ring satisfies the
        target rotational angle.

* * * * *